US012148325B2

(12) United States Patent
Nuttall et al.

(10) Patent No.: US 12,148,325 B2
(45) Date of Patent: Nov. 19, 2024

(54) WRISTBAND ASSEMBLY AND EDGE CONFIGURATION

(71) Applicant: ZEBRA TECHNOLOGIES CORPORATION, Lincolnshire, IL (US)

(72) Inventors: Lee Nuttall, Preston (GB); Derek Bosanko, Preston (GB)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 18/543,661

(22) Filed: Dec. 18, 2023

(65) Prior Publication Data

US 2024/0119868 A1 Apr. 11, 2024

Related U.S. Application Data

(63) Continuation of application No. 17/189,600, filed on Mar. 2, 2021, now Pat. No. 11,847,939.

(51) Int. Cl.

*G09F 3/00* (2006.01)
*A44C 5/00* (2006.01)
*A44C 5/20* (2006.01)

(52) U.S. Cl.

CPC ............ *G09F 3/005* (2013.01); *A44C 5/0015* (2013.01); *A44C 5/0053* (2013.01); *A44C 5/20* (2013.01)

(58) Field of Classification Search

CPC ........ G09F 3/005; G09F 21/02; G09F 21/026; G09F 2003/0251; G09F 2003/0269; A44C 5/0015; A44C 5/0053; A44C 5/20
See application file for complete search history.

(56) References Cited

U.S. PATENT DOCUMENTS 4,093,277 A * 6/1978 Nolan ........................ B41L 1/22 462/57
7,188,764 B2 3/2007 Penuela
9,355,577 B1 5/2016 Coleman et al.
11,557,228 B1 * 1/2023 Kraft ........................ G09F 3/005
2008/0098636 A1 * 5/2008 Greer ...................... G09F 3/005 40/633

(Continued)

FOREIGN PATENT DOCUMENTS

DE 102004020237 A1 11/2005

OTHER PUBLICATIONS

International Search Report and Written Opinion for International Application No. PCT/US2022/16123 mailed on May 13, 2022.

(Continued)

*Primary Examiner* — Gary C Hoge

(57) ABSTRACT

An assembly and/or an edge configuration of a wristband is described herein. In some implementations, a wristband may include a first end portion formed from a first perforated cut in a sheet of material. The first end portion is disposed on a first end of the wristband. The wristband may include a second end portion formed from a second perforated cut in the sheet of material. The second end portion may be disposed on a second end of the wristband that is opposite the first end. The wristband may include a strap portion formed from a percentage cut in the sheet of material. The strap portion may be disposed between the first end portion and the second end portion.

20 Claims, 3 Drawing Sheets

(56) References Cited

U.S. PATENT DOCUMENTS

| | | | |
|---|---|---|---|
| 2012/0285058 | A1 | 11/2012 | Bekker et al. |
| 2018/0225966 | A1 | 8/2018 | Levine et al. |
| 2019/0065920 | A1 | 2/2019 | Ennis et al. |

OTHER PUBLICATIONS

Examination Report for Australian Patent Application No. 2022228284 mailed on Apr. 6, 2024.

* cited by examiner

WRISTBAND ASSEMBLY AND EDGE CONFIGURATION

RELATED APPLICATIONS

The present application is a continuation of U.S. patent application Ser. No. 17/189,600, filed on Mar. 2, 2021, which is incorporated by reference herein in its entirety.

TECHNICAL FIELD

The present disclosure relates generally to wristbands and, for example, to assembly of a wristband and/or an edge configuration of the wristband.

BACKGROUND

A disposable wristband can be used in a variety of applications. For example, such a wristband can be utilized for verification of access or entry to a secure area, such as a hospital and/or entertainment venue, among other examples. In some cases, a wristband is configured with an edge that can irritate a wearer's skin (e.g., cause abrasions or wounds), especially for a wearer with sensitive skin. For example, the edges of the wristband can be shaped or formed according to how the wristband is removed (e.g., ripped or separated) from a sheet of material used to create the wristband and/or how the sheet of material is manufactured to include the wristband. Accordingly, there is a need for assembly of a wristband and/or an edge configuration of a wristband that reduces the harm to a wearer's skin.

DETAILED DESCRIPTION

Figure 1:
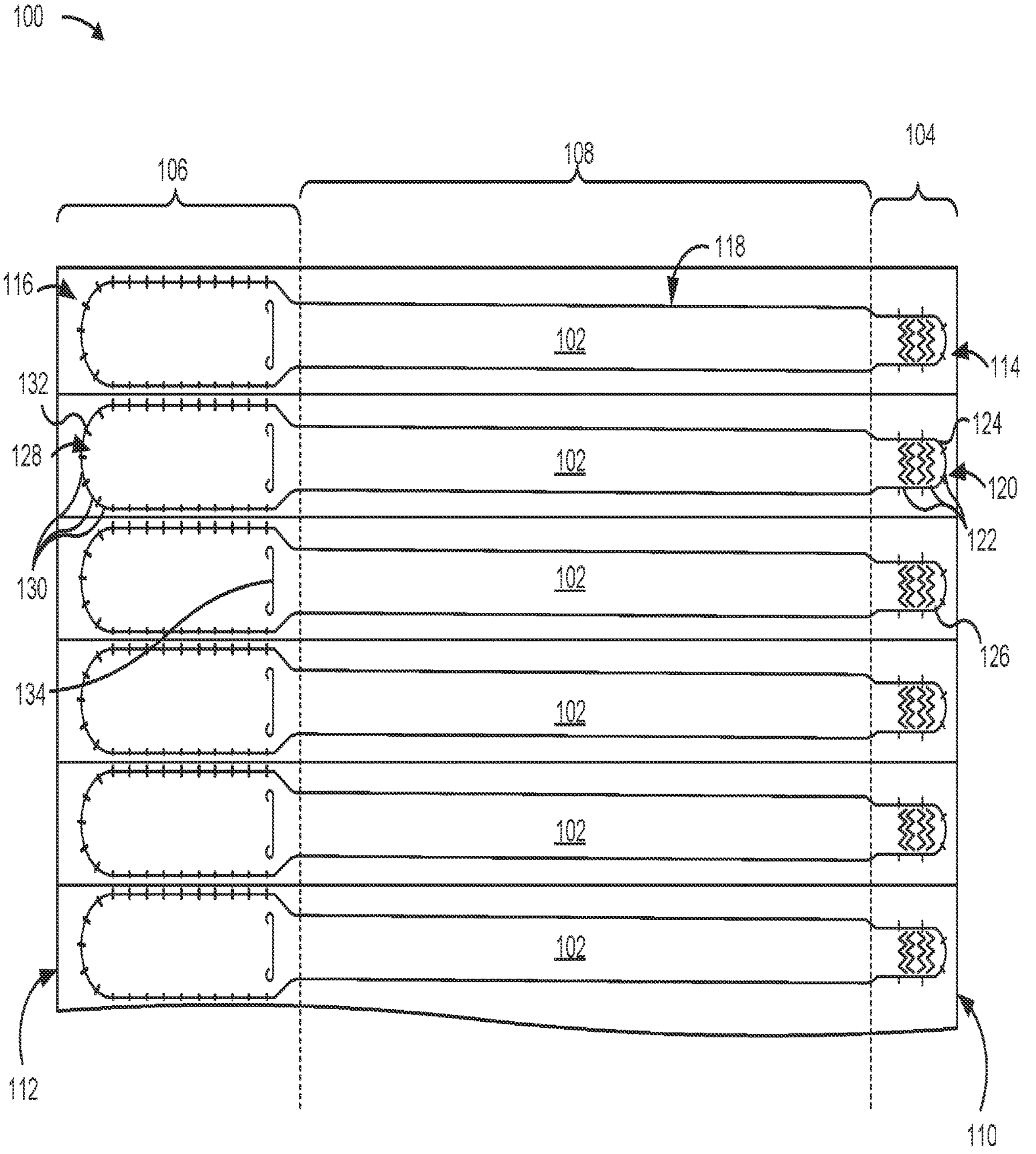
FIG. 1 is a diagram of an example implementation associated with a wristband sheet described herein.

The following detailed description of example implementations refers to the accompanying drawings. The same reference numbers in different drawings may identify the same or similar elements.

A wristband can be obtained from a wristband sheet. The wristband sheet may be manufactured to include and/or hold multiple wristbands until the wristbands are individually removed from the sheet of material to be worn by an individual (or wearer). In some instances, the wristband may be configured to provide (e.g., via a printed label and/or a radio frequency identification (RFID) tag) or indicate information associated with a wearer of the wristband. For example, the wristband may identify a patient or an account of a patient while the patient is admitted to a hospital. To provide such functionality, the wristband can be formed of multiple layers of material that have various strength properties.

In many instances, to facilitate removal of a wristband from the wristband sheet and prevent tearing of the wristband from the wristband sheet, the perimeter of the wristband is formed by a perforated cut pattern in the wristband sheet. The perforated cut pattern includes multiple through cuts through the multiple layers of material that form the wristband sheet. The through cuts are separated by ties in the cut pattern that hold the wristband within the wristband sheet and/or prevent individual layers or portions of the wristband from being separated from the wristband sheet. Once an adequate amount of opposing forces are applied between the wristband and the sheet, the ties are torn and the wristband is ready for use by a wearer. However, in such a case, the ties formed from the perforated cut pattern may cause and/or contribute to irritation in a wearer's skin due to the sharpness of remnants of the ties that are typically left along the edges of the wristband after the wristband is separated from the wristband sheet.

Some implementations described herein provide an assembly for a wristband and/or an edge configuration for a wristband that prevents or reduces irritation to a wearer's skin caused by perforated cut patterns while maintaining a strength of the wristband and a cohesiveness of the wristband until the wristband is removed from the wristband sheet. As described herein, a wristband sheet may include a percentage cut pattern that provides a strap portion of a wristband with nonperforated edges. For example, the percentage cut pattern can facilitate formation of a nonperforated edge when the wristband is removed from the wristband sheet. The wristband sheet may include one or more perforated cut patterns to secure one or more portions (e.g., end portions) of the wristband to the wristband sheet until the wristband is removed from the wristband sheet.

In some implementations described herein, a wristband includes a first end portion formed from a first perforated cut in a sheet of material, wherein the first end portion is disposed on a first end of the wristband; a second end portion formed from a second perforated cut in the sheet of material, wherein the second end portion is disposed on a second end of the wristband that is opposite the first end; and a strap portion formed from a percentage cut in the sheet of material, wherein the strap portion is disposed between the first end portion and the second end portion.

In some implementations described herein, a wristband sheet includes a main layer; a first end portion that includes a first end of a wristband, wherein the first end portion includes a first perforated cut pattern in the main layer that forms a first perforated edge of the first end; a second end portion, opposite the first end portion, that includes a second end of the wristband, wherein the second end portion includes a second perforated cut pattern in the main layer that forms a second perforated edge of the second end; and an intermediate portion, between the first end portion and the second end portion, that includes a strap of the wristband, wherein the intermediate portion includes a percentage cut pattern in the main layer that forms nonperforated edges of the strap.

In some implementations described herein, a wristband includes a main layer; an adhesive portion disposed toward a first end of the wristband, wherein the adhesive portion has a first perforated edge that is formed via a first perforated cut in the main layer; an identification portion disposed toward a second end of the wristband, wherein the identification portion has a second perforated edge that is formed via a second perforated cut in the main layer; and a strap portion that is disposed between the adhesive portion and the identification portion, wherein the strap portion has nonperforated edges formed from a percentage cut in the main layer.

In this way, as described herein, an assembly of a wristband and/or an edge configuration of a wristband can provide a wristband sheet that is configured to secure certain portions of the wristband with multiple layers (e.g., one or more combinations of a main layer, an adhesive layer, and/or an identification layer, among other examples) until the wristband is removed from the wristband sheet. Furthermore, the wristband sheet may permit a wristband to be formed (when removed from the wristband sheet) to have an edge configuration that provides increased comfort of a wearer and reduces irritation of the skin of the wearer (e.g., relative to other wristbands, such as wristbands with perforated edges). Moreover, the assembly of the wristband and/or edge configuration of the wristband provides for a relatively complex arrangement of layers of the wristband that includes relatively few materials, layers, and/or components than other wristbands designed to reduce irritation of skin.

While certain examples are described herein in connection with an individual's (or wearer's) wrist and/or a wristband that is configured to be worn around the individual's wrist, such examples may similarly apply for other limbs and/or other types of bands that are configured to be worn on other limbs or body parts of an individual.

FIG. 1 is a diagram of an example implementation of a wristband sheet 100 described herein. The wristband sheet 100 includes multiple wristbands 102 (which may be referred to individually as "wristband 102") formed from multiple cuts of materials used to form the wristband sheet 100. Individual cuts of the multiple cuts may involve various cut patterns and/or various types of cuts, as described herein. Accordingly, the wristband sheet 100 is configured to hold a wristband 102 until an individual or machine removes the wristband 102 by separating the wristband 102 from the wristband sheet 100 according to the multiple cuts.

The wristband sheet 100 may include a main layer that spans the length of the wristband sheet 100 (e.g., from the first end 110 to the second end 112). The main layer may be formed of a synthetic material, such as a plastic material, a silicon-based material, and/or a rubber material, among other examples. The dimensions of the wristband sheet 100 may be suitably configured according to a quantity of wristbands 102 that are to be included on the wristband sheet 100 and/or an intended use of the wristbands 102. For example, in some implementations, the length and/or the width of the wristband sheet 100 may be larger to accommodate formations of relatively large wristbands 102 for relatively large individuals, and/or the length and/or width of the wristband sheet 100 may be smaller to accommodate formations of relatively small wristbands for relatively small individuals. Additionally, or alternatively, the thickness of the wristband sheet 100 (and/or main layer) may be thicker to provide wristbands 102 that are relatively more durable (e.g., so that the wristbands 102 can withstand relatively harsh conditions) or thinner to provide wristbands 102 that are relatively less bulky (e.g., so that the wristbands 102 can be more comfortable).

As shown in FIG. 1, the wristband sheet 100 includes three main portions, a first end portion (which may be referred to herein as an "adhesive portion 104"), a second end portion (which may be referred to herein as an "identification portion 106"), and an intermediate portion 108. The intermediate portion 108 is disposed between the adhesive portion 104 and the identification portion 106.

The adhesive portion 104 is disposed on a first end 110 of the wristband sheet 100 (e.g., toward the first end 110 relative to the intermediate portion 108 and/or the adhesive portion 104), and the identification portion 106 is disposed on a second end 112 of the wristband sheet 100 (e.g., toward the second end 112 relative to the intermediate portion 108 and/or the identification portion 106).

As shown, the second end 112 is opposite the first end 110. The first end 110 of the wristband sheet 100 may correspond to an adhesive end 114 of a wristband 102, and the second end 112 of the wristband sheet 100 may correspond to an identification end of the wristband 102, as described elsewhere herein. Correspondingly, the adhesive portion 104 may include the adhesive end 114 of the wristband 102. The adhesive portion 104 may include an adhesive material that is attached to the main layer of the wristband sheet 100. For example, the adhesive material may include an adhesive paper with an adhesive (e.g., a glue) and a removable paper that can be removed to expose the adhesive (e.g., to permit the adhesive end 114 of the wristband 102 to be attached to the intermediate portion 108 when worn by an individual). The identification portion 106 may include the identification end of the wristband 102. The identification portion 106 may include an identification material and/or an identification element, such as a printable label and/or a radio frequency identification (RFID) tag, that can be used to provide identification information associated with the wristband 102 and/or a wearer of the wristband 102. The identification material of the identification portion 106 may be the same or similar as the main layer (e.g., both the identification portion 106 and the main layer may be a synthetic material).

The intermediate portion 108 may include a nonperforated cut pattern 118 that forms individual straps of the wristbands 102. For example, the nonperforated cut pattern 118 may include one or more nonperforated cuts. The nonperforated cuts may include percentage cuts of a percentage cut pattern. The nonperforated cut pattern corresponds to a cut pattern in the wristband sheet 100 (and/or the main layer of the wristband sheet 100) that does not involve a cut that goes through (or fully penetrates) the wristband sheet 100 (and/or the main layer of the wristband sheet 100). Accordingly, the depth of the nonperforated cuts of the nonperforated cut pattern 118 may be between 0% and 100% of the thickness of the wristband sheet 100 (and/or the main layer of the wristband sheet 100). For example, the nonperforated cuts may have a depth that is 50% of the thickness of the main layer, 80% of the thickness of the main layer, and/or 95% of the thickness of the main layer, among other examples. The configured depth of the nonperforated cuts of the nonperforated cut pattern 118 may depend on the material of the main layer and/or characteristics of the material of the main layer (e.g., strength, durability, flexibility, and/or the like). In some implementations, the depth of one or more the nonperforated cuts of the nonperforated cut pattern 118 may be substantially uniform (e.g., relative to a manufacturing tolerance or design tolerance). Accordingly, the depth of the nonperforated cuts of the nonperforated pattern 118 may be relatively uniform along the length of the intermediate portion 108 (from the adhesive portion 104 to the identification portion 106).

The adhesive portion 104 may include a first perforated cut pattern 120 that forms the adhesive end 114 of the wristband 102. For example, the first perforated cut pattern 120 may include or be formed from a first perforated cut that includes first through cuts 122 between a set of ties (referred to as "adhesive end ties 124"). The adhesive end ties 124 correspond to uncut portions of the first perforated cut pattern 120 (e.g., uncut synthetic material of the main layer and/or uncut adhesive material of the adhesive portion) and the first through cuts 122 correspond to cuts that go through the wristband sheet 100 (e.g., through the main layer and the adhesive material of the identification portion 106). The adhesive portion 104 may include a kiss cut pattern 126 that includes cuts in a paper of the adhesive material. For example, the kiss cut pattern 126 may facilitate removal of the adhesive end 114 from the strap portion (e.g., by reducing an adhesive strength of the adhesive material or reducing the durability of the paper of the adhesive material).

The identification portion 106 may include a second perforated cut pattern 128 that forms the identification end 116 of the wristband 102. For example, the second perforated cut pattern 128 may include or be formed from a first perforated cut that includes second through cuts 130 between a set of ties (referred to as "identification end ties 132"). The identification end ties 132 correspond to uncut portions of the second perforated cut pattern 128 (e.g., uncut synthetic material of the main layer and/or uncut material of the identification element) and the second through cuts 130 correspond to cuts that go through the wristband sheet 100 (e.g., through the main layer and the material of the identification portion 106).

In some implementations, the first perforated cut pattern 120 is different from the second perforated cut pattern 128 (e.g., to account for a difference in material strength of the adhesive portion 104 and the identification portion 106). For example, the adhesive end ties 124 of first perforated cut pattern 120 may be thicker than the identification end ties 132 of the second perforated cut pattern. Additionally, or alternatively, the first through cuts 122 of the first perforated cut pattern 120 may be shorter than the second through cuts 130 of the second perforated cut pattern 128. In such cases, because the adhesive material may be weaker than the material of the identification element or the material of the identification portion 106, a user may be able to apply a similar amount of force to remove the adhesive end 114 from the wristband sheet 100 as the amount of force that is required to remove the identification end 116 from the wristband sheet 100.

The identification portion 106 may include openings 134 that permit individual adhesive ends 114 of the wristbands 102 to be received and attached to the straps of the intermediate portion (after the wristbands are removed from the wristband sheet 100). The openings 134 may be formed from a through cut through the main layer (and/or the identification layer) of the wristband sheet 100.

Figure 2:
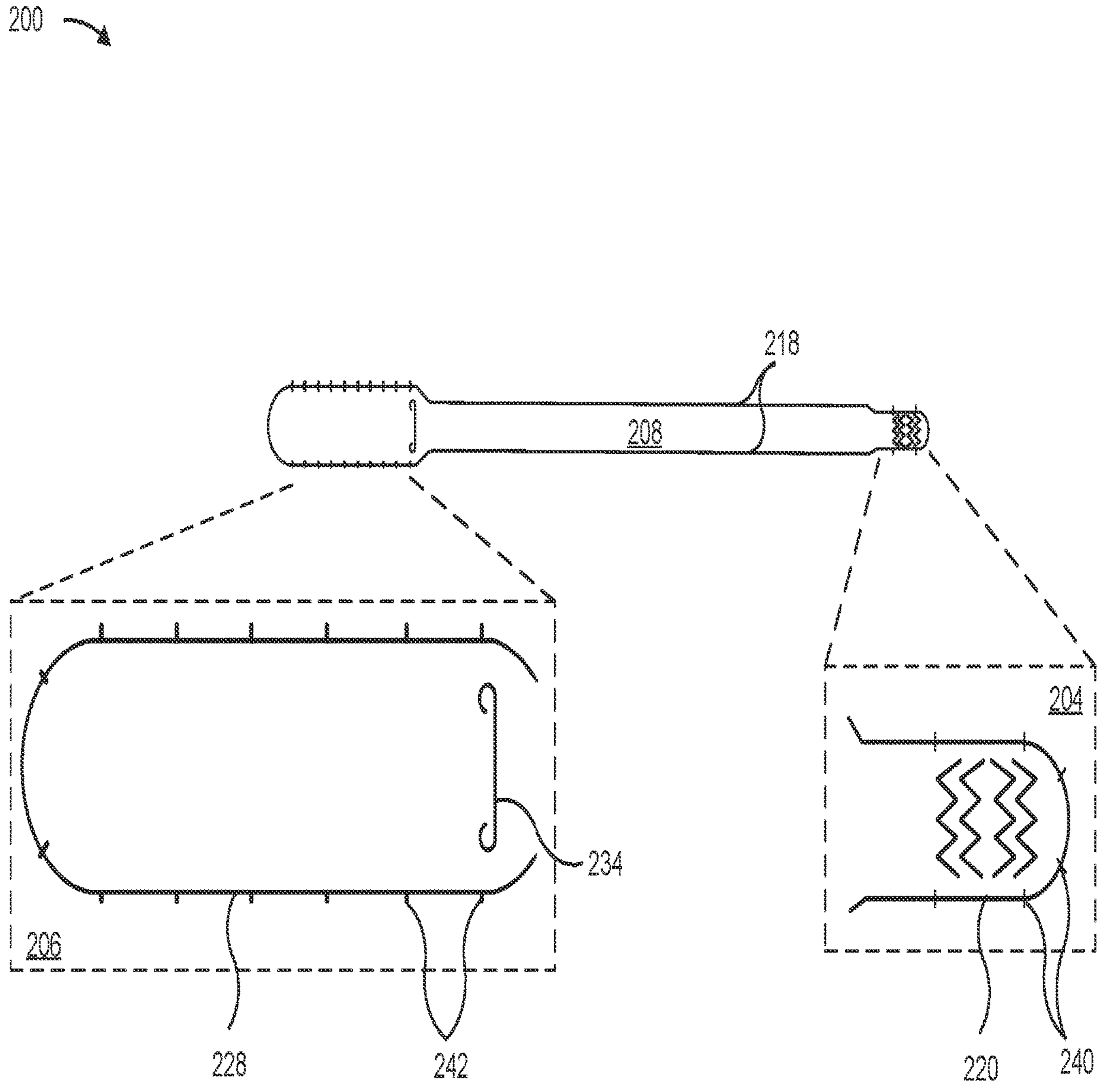
FIG. 2 is a diagram of an example implementation associated with a wristband described herein.

FIG. 2 is a diagram of an example implementation associated with a wristband 200 described herein. The wristband 200 may correspond to one of the wristbands 102 after the wristband 200 is removed from the wristband sheet 100. Correspondingly, the wristband 200 may include a main layer (similar to the main layer described in connection with the wristband sheet 100), an adhesive portion 204, and an identification portion 206. A strap portion 208 may be formed from the intermediate portion 108 of the wristband sheet 100.

Further, the adhesive portion 204 may have a first perforated edge 220 formed from a first perforated cut (e.g., similar to the first perforated cut of the first perforated cut pattern 120) and the identification portion 206 may have a second perforated edge 228 formed from a second perforated cut in the main layer (e g, similar to the second perforated cut of the second perforated cut pattern 128). As shown, the first perforated edge 220 may include first remnants 240 of the adhesive end ties 124 and the second perforated edge may include second remnants 242 of the identification end ties 132.

The strap portion 208 may have nonperforated edges 218 formed from nonperforated cuts (e.g., the nonperforated cuts associated with the nonperforated cut pattern 118 and/or a percentage cut). Accordingly, the strap portion 208, when the wristband 200 is worn, may be less likely to irritate a wearer's skin because the nonperforated edges 218 do not include remnants of ties (similar to the first remnants 240 and/or the second remnants 242).

When the wristband 200 is worn, the adhesive portion 204 is attached to the strap portion 208. The strap portion 208 may have a larger width than the adhesive portion 206 that prevents the first perforated edge 220 from contacting the skin of the wearer, thereby preventing the first remnants 240 from irritating the skin of the wearer. Furthermore, when the wristband 200 is worn, the second perforated edge of the identification portion 206 is configured to be directed away from the skin. For example, the configuration of the opening 234 relative to the strap portion 208 and the identification portion 206 (and/or based on the rigidity of the material of the main layer) may prevent the second perforated edge 232 from contacting the skin of the wearer, thereby preventing the second remnants 242 from irritating the skin of the wearer.

As shown, the nonperforated edges 218, the first perforated edge 220, and the second perforated edge 228 form the perimeter of the wristband 200. Accordingly, the wristband 200 can be worn without irritation to a skin of the wearer caused by remnants of perforated cuts, as described herein.

Figure 3:
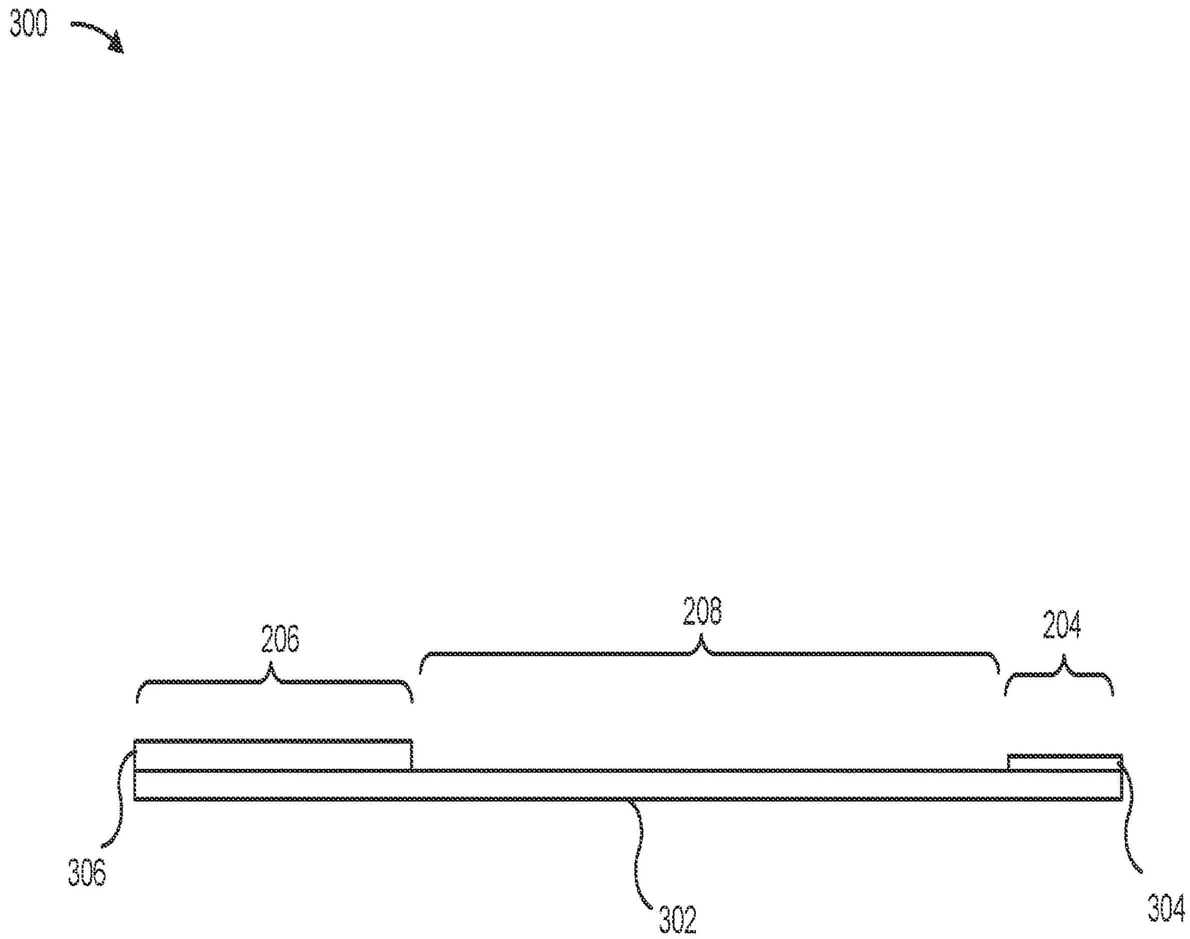
FIG. 3 is a diagram of another example implementation associated with a wristband described herein.

FIG. 3 is a diagram of another example implementation associated with a wristband 300 described herein. A plan view of the wristband 300 is shown in FIG. 3. The wristband 300 may correspond to the wristband 200 and/or the wristband 102. Accordingly, as shown, the wristband 300 includes an adhesive portion 204, an identification portion 206, and a strap portion 208.

As shown in FIG. 3, the wristband 300 includes a main layer 302, an adhesive material 304, and an identification material 306. The main layer 302 extends the length of the wristband 300. However, a length of the adhesive material 304 may be less than or equal to the length of the adhesive portion 204, and/or the length of the identification material 306 may be less than or equal to the length of the identification portion 206. As shown, the adhesive material 304 and the identification material 306 may be attached to the main layer 302 on a same side of the main layer 302, such as a top side of the wristband 300. In some implementations, cuts (e.g., one or more perforated cuts and/or one or more nonperforated cuts) may be performed from the top side of the wristband 300 (e.g., or the material that includes the adhesive material and the identification material).

The foregoing disclosure provides illustration and description, but is not intended to be exhaustive or to limit the implementations to the precise forms disclosed. Modifications and variations may be made in light of the above disclosure or may be acquired from practice of the implementations.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles “a” and “an” are intended to include one or more items, and may be used interchangeably with “one or more.” Further, as used herein, the article “the” is intended to include one or more items referenced in connection with the article “the” and may be used interchangeably with “the one or more.” Furthermore, as used herein, the term “set” is intended to include one or more items (e.g., related items, unrelated items, or a combination of related and unrelated items), and may be used interchangeably with “one or more.” Where only one item is intended, the phrase “only one” or similar language is used. Also, as used herein, the terms “has,” “have,” “having,” or the like are intended to be open-ended terms. Further, the phrase “based on” is intended to mean “based, at least in part, on” unless explicitly stated otherwise. Also, as used herein, the term “or” is intended to be inclusive when used in a series and may be used interchangeably with “and/or,” unless explicitly stated otherwise (e.g., if used in combination with “either” or “only one of”).

What is claimed is:

1. A method, comprising:

forming a first end portion of a wristband in a sheet or material with a first perforated cut through the sheet of material, the first end portion is disposed on a first end of the wristband;

forming a second end portion of the wristband in the sheet of material with a second perforated cut through the sheet of material, the second end portion is disposed on a second end of the wristband that is opposite the first end; and forming a strap portion of the wristband in the sheet of material with a nonperforated cut in the sheet of material having a depth that is less than a total depth of the sheet of material from which the strap is formed, the strap portion is disposed between the first end portion and the second end portion.

2. The method of claim 1, wherein a main layer from the sheet of material extends from the first end to the second end, the first end portion includes an adhesive material that is attached to the main layer, the second end portion includes an identification element that is attached to the main layer, and the adhesive material and the identification element are attached to a same side of the main layer.

3. The method of claim 2, wherein the main layer comprises a synthetic material, and the adhesive material comprises a paper material and an adhesive.

4. The method of claim 2, wherein the identification element comprises a radio frequency identification tag.

5. The method of claim 2, wherein the identification element and the main layer include a same type of material.

6. The method of claim 1, wherein the nonperforated cut has a cut pattern that is configured to cause the strap portion to have edges that are devoid of ties.

7. The method of claim 1, further comprising cutting the first perforated cut using a first perforated cut pattern, and cutting the second perforated cut using a second perforated cut pattern that is different from the first perforated cut pattern.

8. The method of claim 7, wherein a first set of ties that are formed from the first perforated cut pattern are thicker than a second set of ties that are formed by the second perforated cut pattern.

9. The method of claim 7, wherein first through cuts of the first perforated cut pattern are shorter than second through cuts of the second perforated cut pattern.

10. The method of claim 1, wherein the first end portion has a first perforated edge formed by the first perforated cut, wherein the second end portion has a second perforated edge formed by the second perforated cut, and wherein the strap portion has nonperforated edges.

11. A method, comprising:

forming a wristband from a main layer of a wristband sheet, the wristband including a first end portion that defines a first end of the wristband, a second end portion that defines a second end of the wristband a second end portion, and an intermediate portion between the first and second end portions that defines a strap of the wristband;

cutting a first perforated cut pattern in the main layer to form a first perforated edge of the first end;

cutting a second perforated cut pattern in the main layer to form a second perforated edge of the second end; and cutting a nonperforated cut pattern in the main layer that forms nonperforated edges of the strap, the nonperforated cut pattern cuts into the main layer to a depth that is less than a total depth of the main layer.

12. The method of claim 11, wherein the first perforated cut pattern includes a first set of ties of the main layer and the second perforated cut pattern includes a second set of ties of the main layer.

13. The method of claim 12, wherein the first set of ties are formed from a first perforated cut pattern of the main layer and the second set of ties are formed from a second perforated cut pattern of the main layer.

14. The method of claim 11, wherein the first end portion includes an adhesive material that is attached to the main layer and the second end portion includes an identification material that is attached to the main layer.

15. The method of claim 14, wherein the adhesive material includes the first perforated cut pattern and the identification material includes the second perforated cut pattern.

16. A method, comprising:

forming a wristband from a main layer of material;

disposing an adhesive portion toward a first end of the wristband, the adhesive portion having a first perforated edge that is formed via a first perforated cut in the main layer;

disposing an identification portion toward a second end of the wristband, the identification portion having a second perforated edge that is formed via a second perforated cut in the main layer; and disposing a strap portion between the adhesive portion and the identification portion, the strap portion has nonperforated edges formed from a nonperforated cut in the main layer of the wristband having a depth that is less than a total depth of the main layer.

17. The method of claim 16, wherein the first perforated edge is associated with a first set of ties that are thicker than a second set of ties that are associated with the second perforated edge.

18. The method of claim 16, wherein a perimeter of the wristband is formed by the first perforated edge, the second perforated edge, and the nonperforated edges.

19. The method of claim 16, wherein the adhesive portion includes an adhesive material attached to the main layer and the identification portion includes an identification element attached to the main layer.

20. The method of claim 16, wherein the main layer is included within the adhesive portion, the identification portion, and the strap portion.

* * * * *